(12) United States Patent
Madden et al.

(10) Patent No.: US 11,880,212 B2
(45) Date of Patent: Jan. 23, 2024

(54) ROBOT LOCALIZATION

(71) Applicant: Alarm.com Incorporated, Tysons, VA (US)

(72) Inventors: Donald Gerard Madden, Columbia, MD (US); Babak Rezvani, St Petersburg, FL (US); Ahmad Seyfi, Reston, VA (US); Timon Meyer, Centreville, VA (US); Glenn Tournier, Vienna, VA (US)

(73) Assignee: Alarm.com Incorporated, Tysons, VA (US)

( * ) Notice: Subject to any disclaimer, the term of this patent is extended or adjusted under 35 U.S.C. 154(b) by 154 days.

(21) Appl. No.: 17/371,454

(22) Filed: Jul. 9, 2021

(65) Prior Publication Data

US 2022/0012493 A1 Jan. 13, 2022

Related U.S. Application Data

(60) Provisional application No. 63/050,564, filed on Jul. 10, 2020.

(51) Int. Cl.
*G06K 9/00* (2022.01)
*G05D 1/10* (2006.01)
(Continued)

(52) U.S. Cl.
CPC .......... *G05D 1/102* (2013.01); *B64C 39/024* (2013.01); *G01C 21/3852* (2020.08);
(Continued)

(58) Field of Classification Search
CPC .. G05D 1/102; B64C 39/024; G01C 21/3852; G01C 21/20; G06F 18/22; G06V 20/10; B64U 2101/30; B64U 2201/10
(Continued)

(56) References Cited

U.S. PATENT DOCUMENTS 9,205,886 B1 * 12/2015 Hickman ............. G05D 1/0274
11,377,199 B2 * 7/2022 Mitrovic ................ B64D 27/10
(Continued)

FOREIGN PATENT DOCUMENTS

| CN | 111095357 | * | 5/2020 | ............. G06T 7/251 |
| CN | 10753331 | * | 7/2022 | ........... G08G 5/0089 |
| KR | 20210048027 | * | 5/2021 | ............. B60L 53/12 |

*Primary Examiner* — Jerome Grant, II
(74) *Attorney, Agent, or Firm* — Fish & Richardson P.C.

(57) ABSTRACT

Methods, systems, and apparatus, including computer programs encoded on computer storage media, for determining that current data captured at a current location of a drone satisfies localization adjustment criteria; in response to determining that the current data captured at the current location of the drone satisfies the localization adjustment criteria, identifying previously captured image data; determining a previous expected location of the drone based on both an expected change in location of the drone and a first previous location determined from other image data captured before the previously captured image data; determining a location difference between the previous expected location of the drone and a second previous location determined from the previously captured image data; and determining the current location of the drone based on the location difference.

20 Claims, 3 Drawing Sheets

(51) Int. Cl.
  *B64C 39/02*     (2023.01)
  *G01C 21/00*     (2006.01)
  *G06V 20/10*     (2022.01)
  *G06F 18/22*     (2023.01)
  *B64U 101/30*    (2023.01)
(52) U.S. Cl.
  CPC .............. *G06F 18/22* (2023.01); *G06V 20/10*
              (2022.01); *B64U 2101/30* (2023.01)
(58) Field of Classification Search
  USPC ........................................................ 382/103
  See application file for complete search history.

(56) References Cited

U.S. PATENT DOCUMENTS

| | | | |
|---|---|---|---|
| 11,467,001 B2 * | 10/2022 | Kitaura | ................... G06T 7/579 |
| 2021/0089772 A1 * | 3/2021 | Yang | ................... G06V 10/764 |

* cited by examiner

ROBOT LOCALIZATION

CROSS-REFERENCE TO RELATED APPLICATION

This application claims the benefit of U.S. Provisional Application No. 63/050,564, filed on Jul. 10, 2020, the contents of which are incorporated by reference herein in its entirety.

BACKGROUND

A monitoring system for a property can include various components including sensors, cameras, and other devices. For example, the monitoring system may use the camera to capture images of people that enter the property.

SUMMARY

This specification describes techniques, methods, systems, and other mechanisms for robot localization. Localizing a robot may be useful. For example, a property may include a number of robots that complete tasks involving navigating around the property. To successfully carry out missions while avoiding various obstacles that may exist on the property, the robot may use localization processes to determine its location relative to a previously generated and compiled local map of the property.

The robot may be capable of movement tracking including various forms of odometry. The movement tracking can enable the robot to determine where it has moved relative to a starting position. For example, the robot can use visual inertial odometry (VIO) that combines inertial measurements with visual features detected in captured images to determine motion of the robot. Features detected in sequential images can be used to determine how the robot is moving. If a detected stationary feature moves to the right as the robot moves, the movement of the robot can be determined to generally correspond to the robot moving to the left. Additional details from the movement of features within captured image data or onboard sensor measurements can be used to determine additional details of the movement of the robot.

The robot may combine movement tracking with periodic localization processes. Where the movement tracking helps track the robot with respect to a given point, the localization can provide the robot with the given point. The given point can be a specific location within a previously generated local map. It may be advantageous to reduce the frequency of localization to save on processing computing cycles. For example, the process of localization can be computationally expensive and a mobile robot such as an autonomous drone or the like may have limited processing ability, processing bandwidth, or energy storage. Therefore, it can be advantageous to perform localization as infrequently as possible.

Although it may be advantageous to perform localization as infrequently as possible, performing localization as infrequently as possible may result in substantial drift accumulation or other events that make the process of localization, when performed, more difficult or less accurate. For example, a robot can perform a first localization and begin to move in accordance with a current mission. At a later time, the robot may have drifted to a location that includes no visual features (e.g., lamp, sofa, tree, or other visual features on a property) with which to help localize. In this example, the robot has saved computational processing power by not performing a second localization but may now be unable to localize successfully.

In one exemplary implementation, a robot may be able to store image data from one or more previous locations in a buffer image database. In contrast to the example above, a robot can capture image data at one or more locations as the robot moves to a location that includes no visual features. Once at the location that includes no visual features, the robot can use elements of the previously captured image data that contain more visual features or higher quality visual features to use for localization. The resulting localization can help determine an accurate location for the robot at a previous point in its trajectory. The accurate location can then be used to inform a correction to the current location of the robot. In this way, the robot can save computational processing power by reducing a frequency of localization while maintaining an ability to accurately locate itself within a given space.

In some cases, the robot may begin to drift between periodic localization processes as a result of accumulated errors in the movement tracking processes or a malfunction. The drift may result in the robot not being in a good location to perform localization. For example, the robot may be pointed towards a blank wall with no recognizable features to help locate the robot with respect to the local map. In this case, the robot can use data previously stored to process a localization.

The robot may be able to store image data from one or more previous locations in a buffer image database. In some implementations, the robot does not determine location directly from the stored image data but waits until a localization condition satisfies adjustment criteria. Responsive to detecting that the localization condition satisfies the adjustment criteria, the robot can retrieve image data from the buffer image database corresponding to at least one of the one or more previous locations. The robot can calculate, based on the retrieved image data, an actual location value of the one previous location. The actual location value of the one previous location is compared to an expected location value to determine a location difference.

The location difference can be used to calculate a current location of the robot and a corrected location of the robot. The corrected location of the robot can be where the robot should move in order to be on the expected trajectory or to be at an expected location. Movement controllers of the robot can then, using the corrected location of the robot, move the robot to the expected trajectory or the corrected location. In this way, the robot can overcome accumulated drift or error in navigation and continue or complete a given mission.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
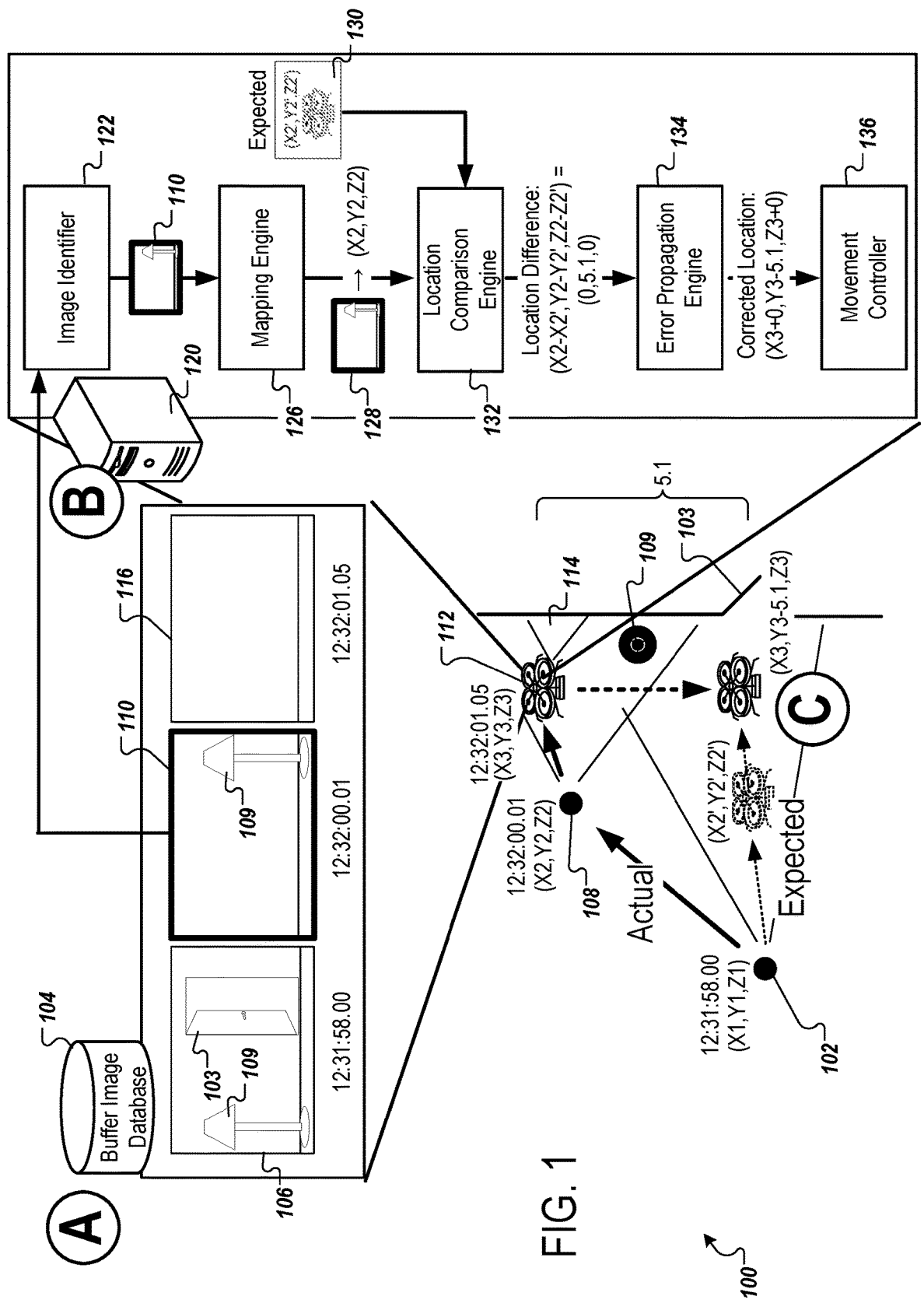
FIG. 1 is a diagram showing an example of a system for robot localization.

FIG. 1 is a diagram showing an example of a system 100 for robot localization. The system 100 includes a robot 112 attempting to navigate to a door 103. The robot 112 proceeds from a first location 102 at X1,Y1,Z1 to a second location 108 at X2,Y2,Z2 and from the second location 108 to a current location at X3,Y3,Z3. In the example of FIG. 1, three values, such as X1,Y1,Z1, represent an x coordinate, y coordinate, and z coordinate, respectively. X1,Y1,Z1 correspond to the first location 102 within a three-dimensional space. The system 100 also includes a buffer image database 104 and a control unit 120. The robot 112 captures image data and stores the image data in the buffer image database 104. The control unit 120 processes the image data stored in the buffer image database 104.

In stage A of FIG. 1, the robot 112 captures first image data 106 at the first location 102. The first image data 106 includes visual features of the door 103 and a light fixture 109. A first timestamp of 12:31:58.00 describes when the first image data 106 was captured. The robot 112 then captures second image data 110 at the second location 108. The second image data 110 includes visual features of the light fixture 109. A second timestamp of 12:32:00.01 describes when the second image data 110 was captured. The robot 112 then captures third image data 116 at the current location X3,Y3,Z3. The third image data 116 includes neither the door 103 nor the light fixture 109. A third timestamp of 12:32:01.05 describes when the third image data 116 was captured.

Item 114 shows graphically a region captured within the third image data 116. Similar graphical elements show regions corresponding to the first image data 106 and the second image data 110. The movement of the robot 112 from the first location 102 to the second location 108 and from the second location 108 to the current location at X3,Y3,Z3, corresponds to actual movement of the robot 112. The actual movement, in the example of FIG. 1, is not the same as expected movement of the robot 112. The robot 112 is attempting to navigate to the door 103 but due to errors, such as drift in the navigation processing and the like, the robot 112 is not performing the expected movement.

In some implementations, drift occurs during the course of odometry calculations. For example, VIO can be used to determine the relative movement of the robot 112 compared to visual features in a field of view. The robot 112 can detect an element on the right of the field of view move to the left of the field of view subsequent to movements performed by the robot 112. The robot 112 can determine, based on the relative movement of the element from the right of the field of view to the left of the field of view, that the robot 112 moved from left to right among other details. Additional detections including angle and distance to the element can be used to determine how much the robot 112 moved or other details including pose of the robot 112, altitude, and the like.

At the current location X3,Y3,Z3, the robot 112 determines the third image data 116 satisfies localization adjustment criteria. In this case, the localization adjustment criteria include detecting no visual features in a field of view in which to perform localization. Visual features can aid the robot 112 in determining an absolute location within a given space. Determining an absolute location can be used periodically in combination with relative locations obtained from onboard calculations such as calculations performed in VIO or similar odometry based methods.

In stage B of FIG. 1, the control unit 120 of the robot 112 performs processing to re-localize the robot 112. The control unit 120 uses the buffer image database 104 to find a previously stored image that contains features for localization. The control unit 120 can use the features to determine a location corresponding to the previously stored image. The control unit 120 can compare the location determined using the previously stored image with an expected location. The difference value between the location determined by the control unit 120 and the expected location can then be propagated to obtain a current location of the robot 112 or inform subsequent actions by the robot 112.

The control unit 120 includes an image identifier 122, a mapping engine 126, a location comparison engine 132, an error propagation engine 134, and a movement controller 136. The image identifier 122 identifies the second image data 110 corresponding to the second timestamp of 12:32:00.01 to be used for localization. The image identifier 122 sends the second image data 110 to the mapping engine 126.

The mapping engine 126 receives the second image data 110. The mapping engine 126 uses the second image data 110 to determine a location within a local map. In the example of FIG. 1, the control unit 120 determines the second image data 110 includes the light fixture 109 at a particular location and angle consistent with the robot 112 being at the location X2,Y2,Z2. The mapping engine 126 can use previously stored image data of the light fixture 109 and compare the second image 110 with the previously stored image data of the light fixture 109 to determine the location X2,Y2,Z2. The mapping engine 126 sends the location X2,Y2,Z2 corresponding to the second image data 110 to the location comparison engine 132.

The location comparison engine 132 compares the location X2,Y2,Z2 received from the mapping engine 126 with the expected location of X2',Y2',Z2'. In the example of FIG. 1, the expected location X2',Y2',Z2' is calculated by the robot 112 based on a previous localization that determined an absolute location on the local map and one or more subsequent odometry calculations or the like corresponding to movements of the robot 112. The calculations result in a location difference from the expected location of the robot 112 and the actual location of the robot 112.

The location comparison engine 132 calculates the difference between the location X2,Y2,Z2 determined by the mapping engine 126 and the expected location X2',Y2',Z2' by comparing representations of the corresponding locations. In the example of FIG. 1, a three-dimensional coordinate system is used for representing the locations where three numerical values corresponding to an x coordinate, a y coordinate, and a z coordinate describe the particular locations. A difference between two locations can be calculated as the difference value between each component coordinate of the locations. For example, a difference value of x coordinates is determined as the difference between X2 and X2', a difference value of y coordinates is determined as the difference between Y2 and Y2', and a difference value of z coordinates is determined as the difference between Z2 and Z2'.

In the example of FIG. 1 the difference between the actual location of X2,Y2,Z2 and the expected location of X2',Y2',Z2' is calculated as follows in Eq. 1:

$$(X2,Y2,Z2)-(X2',Y2',Z2')=(X2-X2',Y2-Y2',Z2-Z2')=(0,5.1,0) \quad (1)$$

The location difference of 0,5.1,0 is sent to the error propagation engine 134. The error propagation engine 134 back corrects the drift calculated based on the location comparison engine 132 and propagates the correction forward to inform adjustments to a current pose or location of the robot 112. For example, the robot 112 can track movements performed from 12:32:00.01 to 12:32:01.05. The robot 112 can combine the tracked movements with the correction 0,5.1,0 to determine an actual current location of the robot 112. As shown in FIG. 1, the actual current location value of the robot 112 is X3,Y3,Z3. Similarly, the robot 112 can use the correction 0,5.1,0 combined with the actual current location to calculate a corrected location. The corrected location in the example of FIG. 1 can be calculated as follows in Eq. 2:

$$(X3,Y3,Z3)-\Delta(x,y,z)=(X3,Y3,Z3)-(0,5.1,0)=(X3,Y3-5.1,Z3) \qquad (2)$$

The corrected location can be a location closer to the expected location compared to the current location X3,Y3,Z3. In the example of FIG. 1, the robot 112 is attempting to navigate to the door 103. In this example, the corrected location X3,Y3-5.1,Z3 is closer to the door 103 than the current location X3,Y3,Z3.

The corrected location X3,Y3-5.1,Z3 is used by the movement controller 136. The movement controller 136 activates motors or the like on the robot 112. In the example of FIG. 1, propellers affixed to the robot 112 are activated to propel the robot 112 from the location corresponding to X3,Y3,Z3 to the corrected location X3,Y3-5.1,Z3.

In some implementations, the corrected location X3,Y3-5.1,Z3 and the process leading to the result is measured based on success criteria to determine if localization is successful or not successful. For example, measurements from sensors can be captured subsequent to moving to the corrected location X3,Y3-5.1,Z3. If the measurements from the sensors are consistent with expected measurements at that point based on a previously compiled and stored local map, the localization can be successful. In another example, the calculated corrected location can be compared with a corresponding location in the previously compiled and stored local map. If the calculated corrected location is not consistent with an expected location on the local map, the robot 112 can attempt to localize again using the second image data 110 or using different image data.

In some implementations, a confidence value associated with a localization is used. A confidence value can be used instead of, or in addition to, success criteria. The corrected location can be compared with a number of expected variables based on either moving to the location or referencing the corrected location in the previously compiled local map. In one implementation, the more values that match expected values or fall within a given threshold, the higher the confidence value. The more values that do not match expected values or do not fall within a given threshold, the lower the confidence value. In some cases, the quality of image data used to localize can influence a confidence value. In some cases, the success criteria can include checking the confidence value and determining if the localization is successful or not successful based on the confidence value.

In stage C of FIG. 1, the robot 112 arrives at the corrected location X3,Y3-5.1,Z3. The localization process performed by the control unit 120 operating on data stored within the buffer image database 104 is able to provide data to enable the robot 112 to move closer to the attempted target location near the door 103. The robot 112 can continue with a given mission or request further localization processing or other processing depending on implementation. In some cases, a mission can include a request from a user or central station for the robot 112 to perform one or more actions. In the example of FIG. 1, the robot 112 performs a mission corresponding to a request to move through the door 103.

In some implementations, the robot 112 communicates with an external central station. For example, the robot 112 can communicate with the external central station to determine a corrected location. The external central station can determine the corrected location similar to the process shown performed by the control unit 120 in FIG. 1. The external central station can send the corrected location or instructions for actuator controls to the robot 112. The robot 112 can subsequently move to the corrected location. The robot 112 can re-localize based on whether or not the localization performed by the external central station is successful or not successful.

In some implementations, the second image data 110 includes information from two or more frames captured by the robot 112. For example, the second image data 110 can include a series of three frames. Feature extraction applied to the image by either the buffer image database 104 or the control unit 120 can detect features within the three frames. The three frames can be used together or in isolation for processing. For example, in some cases, one of the three frames is corrupted or includes an obscuring element that obscures a feature. In this case, processing steps can use the other, unaffected frames. In some cases, a relative change in a feature from one frame to the next can be used to aid in determining a location. For example, the mapping engine 126 can use multiple frames to determine parallax movement or other characteristics present in image data of one or more features.

In some implementations, the control unit 120 localizes based on sensor data. For example, the robot 112 can use Light Detection and Ranging (LIDAR) to detect a wall in front of itself. The robot 112, based on an internal map, expects to be facing an open doorway. In the example of FIG. 1, the robot 112 can detect a distance of 2 feet corresponding to a light path between a LIDAR sensor and the wall in front of the robot 112. The robot 112 may expect to be located at the door 103 in which case the robot 112 may expect to detect a distance of 17 feet corresponding to a light path from the LIDAR sensor through the door 103 and into an adjacent room. The detected value in this case is 2 feet while the expected value is 17 feet. The difference between the expected value and the detected value can be sufficient to trigger re-localizing by processing one or more images stored in the buffer image database 104.

In some implementations, the robot 112 detects an absence of any features before localizing. For example, the robot 112 can detect that no features exist in the current view to enable a localization process. The robot 112, including the control unit 120, can then use the buffer image database 104 to localize based on identified image data that includes at least one feature for localization.

In some implementations, the robot 112 localizes at specific waypoints. For example, the robot 112 can reach a predetermined location during a mission. Upon reaching the predetermined location, the robot 112 can run localization processing to determine its location relative to the local map. In some cases, exactly when the predetermined location is reached by the robot 112 is estimated based on odometry. The odometry can be calculated by the robot 112 or a system or unit communicably connected to the robot 112.

In some implementations, environment data captured at a given location satisfies localization adjustment criteria. For example, changes in lighting conditions detected by the robot 112 can make localization more difficult. In this case, the environmental variable of the lights can be sufficient to satisfy the localization adjustment criteria. The robot 112 can perform the localization process. In another example, changes to furniture location can affect the localization ability of the robot 112. In one implementation, the robot 112 can detect the moved furniture or other object on the property and process localization using features that haven't moved. For example, if a sofa and a chair in a room are features that can be mapped to a local map and the chair has moved but the sofa has not, the robot 112 can use the sofa for localization and not the chair. In some cases, a threshold discrepancy can be used to determine when an object is not in an expected location. In some cases, the robot 112 can add the new location or other detail onto the local map following one or more observations depending on predetermined system settings.

In some implementations, the robot 112 sends a signal to a user. For example, if the robot 112 attempts localization, the robot 112 can send a signal to the user detailing the location attempt, why it was performed, what the result was, among other metrics. In some cases, the user can select what aspects of a localization event to be notified with. Depending on the localization attempt, the robot 112 can send a signal to the user to change an element of the environment or perform other actions. For example, if the lighting condition unexpectedly changes during a mission, the robot 112 can send a signal to the user to adjust the lights.

In some implementations, the robot 112 localizes before a part of a mission. The robot 112 may be about to navigate into a sensitive area where precise location is important. A user may designate an area within a local map as off limits or an area of sensitivity where additional caution should be employed by any navigating robot. When about to enter such an area, or an area near such an area, the robot 112 can localize to increase a confidence value associated with its current position. For example, the robot 112 may need to fly through an area with potted plants. The robot 112 localizes before flying through the area using image data stored within the buffer image database 104 to increase a confidence value and reduce any likelihood of colliding with the potted plants or flying closer than a predetermined distance from them.

In some implementations, the robot 112 re-localizes based on tracking image data over a period of time. For example, the robot 112 can detect 2 features in a first image data item. The first image data item is saved to the buffer image database 104 at a time corresponding to a first timestamp. The robot 112 detects 1 feature in a second image data item saved to the buffer image database 104 at a time after the first timestamp. Based on a decrease of features, the robot 112 can attempt a localizing process preemptively. In some cases, the robot 112 detects 0 features in a third image data item saved to the buffer image database 104 after the second image data item. By preemptively starting the localizing process detailed in FIG. 1, the robot 112 can save time in rerouting from the actual path to the expected path. By preemptively starting the localizing process, the robot 112 can seamlessly relocate to a corrected location without waiting on processing steps to finish. In some cases, other variables can be tracked to determine localization while the robot 112 is still moving in a given trajectory. The difference value computed by the control unit 120 can then be applied to the current location of the robot 112. The current location of the robot 112 can be determined by tracking location changes from the start of the localization process to the end of the localization process.

In some implementations, the expected location of the robot 112 is calculated based on a previous location determined by feature mapping. For example, the first location 102 can correspond to a location where the robot 112 localized successfully. The expected location of the robot 112 of X2',Y2',Z2' can be computed based on the first location 102 and subsequent movements tracked by the robot 112. The subsequent movements can be relative based on the starting location. For example, the robot 112 can detect, based on sensors onboard, that the robot is moving in the x direction a value of 3 and up in the y direction a value of 0.5. The expected location can then be the first location 102 combined with the difference in location detected by the robot 112. The difference can be calculated with VIO or other method that uses onboard sensors. In some cases, error or drift can result in this expected location being different from the actual location as shown in FIG. 1.

In some implementations, the buffer image database 104 includes image data since a previous successful localization attempt. For example, if localization results in a location with a confidence value above a certain threshold, the robot 112 can determine the localization is a success. The buffer image database 104 can store image data items captured since this successful localization. Storing only image data items captured since the successful localization can help reduce the amount of storage necessary for the robot 112.

In some implementations, the buffer image database 104 is cleared after a successful localization attempt. For example, after localization results in a location that satisfies given success criteria, the buffer image database 104 can be cleared to free up storage for subsequent image data items to be stored.

In some implementations, image data in the buffer image database 104 is captured based on elements of the robot 112. For example, the robot 112 can collect image data more rapidly when moving more quickly than when moving more slowly. The robot 112 can similarly collect image data more rapidly when rotating more quickly than when rotating more slowly. If the robot 112 detects a certain condition, for example, one sensor is malfunctioning, the robot 112 can stop capturing data from the malfunctioning sensor and collect data from only non-malfunctioning sensors.

In some implementations, the buffer image database 104 is managed based on available storage space. For example, the robot 112 can delete portions of image data stored in the buffer image database 104 to effectively increase the amount of time between two adjacent saved image data items. In this way, the robot 112 can continue capturing image data for long intervals without running out of storage space. In another example, the robot 112 can employ a particular algorithm to manage the buffer image database 104. In some cases, the particular algorithm can identify images that would be good candidates for localization without actually performing localization. The robot 112 can then choose to keep only the good candidates for localization. In some cases, the robot 112 can rank one or more image data items based on criteria. For example, the robot 112 can rank one or more image data items based on the number and quality of features present in the image data items. Image data items with more features captured with higher quality can be ranked above image data items with fewer features captured with lower quality.

In some implementations, the buffer image database 104 includes visual images captured by the robot 112. In some cases, a camera affixed to the robot 112 can be used to capture the visual images. Other sensors can similarly be used to detect features in an area surrounding the robot 112.

For example, LIDAR, infrared, time of flight sensors, and any other sensor affixed to the robot 112 can be used to inform subsequent image data stored in the buffer image database 104. In some implementations, the buffer image database 104 includes image data corresponding to certain features included in images captured by the robot 112. The features can be extracted from visual images or from data recorded by one or more sensors. Extracted features or other image data can then be used for localization processing by the control unit 120. In some cases, features are extracted from captured data prior to the robot 112 storing the extracted features as data in the buffer image database 104.

In some implementations, the image identifier 122 uses a score value associated with one or more data items within the buffer image database 104 to identify a data item for processing. For example, a high score value can represent image data that is more likely to give an accurate localization. A high score value can correspond to image data with at least one clearly visible feature and good lighting. In some cases, movement of the robot 112 is used to determine a score value of image data. For example, if the robot 112 is moving slowly, image data captured while the robot 112 is moving slowly can be scored higher than image data captured while the robot 112 is moving quickly. This may be useful in instances where motion blur can distort features within a captured image.

In some implementations, the image identifier 122 uses a search algorithm to identify image data within the buffer image database 104. For example, the image identifier 122 can use a binary search method or the like to navigate through the stored data within the buffer image database 104. The search algorithm can be used to identify images that are likely to result in an accurate localization. For example, the search algorithm can take into account a score or other variable associated with particular image data to distinguish two or more data items. In some cases, a variable associated with two data items can determine which, of the two data items, is to be used for localization processing. In some cases, more recently captured image data is scored higher. The more recently captured image data can, in some cases, provide more accurate location difference values when the difference values are propagated from the location corresponding to the previously captured image to the current location.

In some implementations, image data within the buffer image database 104 includes other forms of metadata. For example, the image data can include a timestamp corresponding to when particular data was saved to the database 104. In some cases, environmental variables within the system 100 can be detected and stored along with particular image data. For example, a variable describing an amount of light used to capture data related to an image can be stored. Similarly, a quality factor may be used to determine the probable accuracy of data stored within the image database 104.

Figure 2:
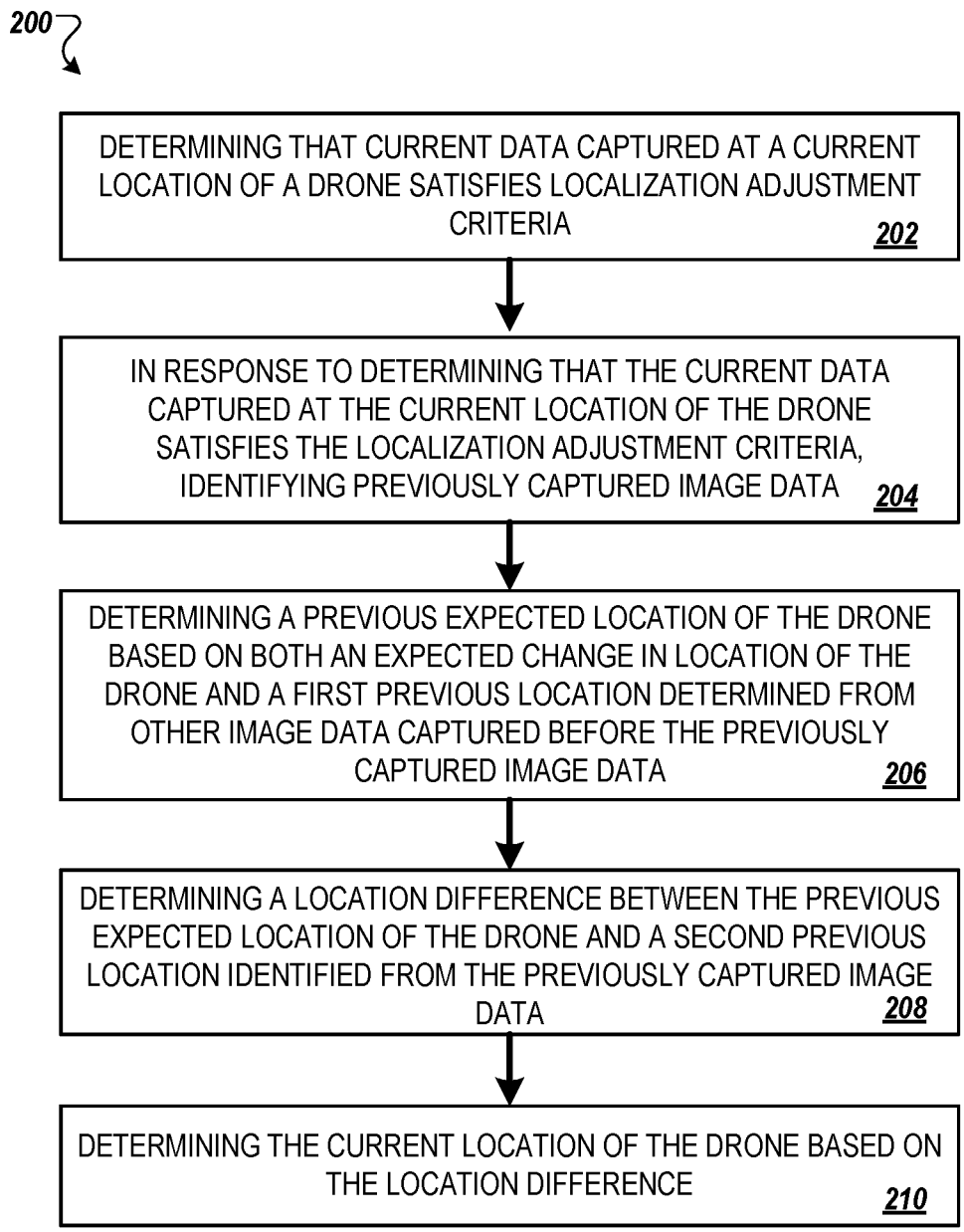
FIG. 2 is a flow diagram illustrating an example of a process for robot localization.

FIG. 2 is a flow diagram illustrating an example of a process 200 for robot localization. The process 200 can be applied to the system 100 of FIG. 1.

The process 200 includes determining that current data captured at a current location of a drone satisfies localization adjustment criteria (202). For example, the robot 112 detects that there are no visual features in the field of view corresponding to the third image data 116. Visual features can aid the robot 112 in determining an absolute location within a given space. In some cases, the localization adjustment criteria include detecting no visual features in a field of view in which to perform localization.

In some implementations, determining that the current data captured at the current location of the drone satisfies localization adjustment criteria may include detecting no visual features in one or more images of the current data. For example, as discussed in FIG. 1, a robot may be pointed towards a blank wall with no recognizable features to help locate the robot or simply pointed at one or more items that are not associated with a known location with respect to the local map. With no visual features, localization adjustment may be performed based on data previously stored where the previously stored data is determined to include at least one visual feature for localization.

In some implementations, determining that the current data captured at the current location of the drone satisfies localization adjustment criteria may include determining that one or more expected visual features are not shown in one or more images of the current data. For example, a robot may determine, based on an expected current location, that one or more known visual features should be visible. If at least one of the one or more known visual features are not visible, it may indicate that the robot is not where it expects. In other words, an actual location of the robot may not be equivalent to the expected location. In this case, localization may be performed using any current features of the current data if any are visible as well as, or in addition to, using one or more stored images and detected features therein. In some cases, a feature may be visible if it is detected by object or feature detection software used by the robot or control unit communicatively connected to the robot.

In some implementations, determining that the current data captured at the current location of the drone satisfies localization adjustment criteria may include comparing an expected sensor value to an actual sensor value of the current data and determining that the current data captured at the current location of the drone satisfies localization adjustment criteria based on a difference between the expected sensor value and the actual sensor value. For example, as discussed in reference to FIG. 1, the robot 112 can detect a distance of 2 feet corresponding to a light path between a LIDAR sensor and the wall in front of the robot 112. The robot 112 may expect to be located at the door 103 in which case the robot 112 may expect to detect a distance of 17 feet corresponding to a light path from the LIDAR sensor through the door 103 and into an adjacent room. The detected value in this case is 2 feet while the expected value is 17 feet. The difference between the expected value and the detected value can be sufficient to satisfy the localization adjustment criteria and trigger a localization process as discussed herein.

Although LIDAR is discussed, any sensor and any corresponding sensor measurements may be determined as expected and compared to actual measurements to determine if the localization adjustment criteria is satisfied. For example, sensor data from any of the following sensors may be predicted and compared with actual sensor data corresponding to the given sensor including, but not limited to: a gyroscope, a barometer, an accelerometer, a GPS sensor, a magnetometer, a rangefinder, a sensor for measuring Inertial Measurement Unit (IMU), and visual sensors.

In some implementations, sensor data is used to satisfy localization adjustment criteria. For example, the robot 112 of FIG. 1 captures the third image data 116. The third image data 116 includes a sensor value corresponding to a wall in front of the robot 112. The expected location of the robot 112 is near the door 103. At the expected location, the robot 112 is not facing a wall and would not detect a wall. Based on the discrepancy between an expected sensor value associated with not detecting a wall and an actual sensor value associated with a wall detection, the robot 112 determines that there was drift or another error and processes localization using the control unit 120. In this case, the third image data 116 satisfies the localization adjustment criteria.

The process 200 includes, in response to determining that the current data captured at the current location of the drone satisfies the localization adjustment criteria, identifying previously captured image data (204). For example, the image identifier 122 shown in FIG. 1 processes one or more image data items stored within the buffer image database 104. The image identifier 122 identifies the second image data 110. In the example of FIG. 1, the image identifier 122 determines based on characteristics of the second image data 110, including the light fixture 109 which can serve as a feature for location mapping, that the second image data 110 is qualified for subsequent processing.

In some implementations, identifying the previously captured image data may include determining that the previously captured image data includes at least one visual feature. For example, as discussed in FIG. 1, the second image data 110 may include a visual feature of the light fixture 109 which can serve as a feature for location mapping. In some cases, more or fewer features may be detected or required for identifying the previously captured image data. For example, to generate a more accurate position using localization techniques, more features may be required. While this may generate a more accurate initial position, it may require using a larger buffer to store data obtained earlier in time and may not be as accurate once propagated to a current location. For this reason, a system may optimize the number or types of features required to identify the previously captured image data based on iterative testing and comparison of the accuracy of subsequently generated current location corrections.

In some implementations, the image identifier 122 selects additional data items from the buffer image database 104. For example, in some cases, the image identifier 122 selects a first item from the buffer image database 104 and the first item results in a localization that does not meet a threshold for success. The image identifier 122 can identify a second item that is different from the first item to be processed. The image identifier 122 can select additional items until a localization attempt is successful. In some cases, the image identifier can start with more recent image data and move to less recent image data if the more recent image data does not result in successful localization based on predetermined success criteria.

In some implementations, the image identifier 122 selects two image data items from the buffer image database. The control unit 120 then processes the two image data items to calculate two distinct corrected locations. If a difference value calculated from a difference of the two distinct corrected locations is within a predetermined difference threshold, the localization is a success. If the difference value is not within the predetermined difference threshold, the localization is not a success. In some cases, if the localization is a success, further processing of the two distinct corrected locations can be performed to obtain a single corrected location. For example, an average of the two distinct corrected locations can be performed to obtain a single corrected location.

The process 200 includes determining a previous expected location of the drone based on both an expected change in location of the drone and a first previous location determined from other image data captured before the previously captured image data (206). For example, the expected location of X2',Y2',Z2' can be computed based on an expected change from the first location 102. The first location 102 can be the result of a previous localization process. The expected change can be calculated based on odometry, VIO, or the like by the robot 112 or a processing unit communicably connected to the robot 112.

The process 200 includes determining a location difference between the previous expected location of the drone and a second previous location identified from the previously captured image data (208). For example, the location comparison engine 132 receives both the location, X2,Y2,Z2, identified from the second image data 110 and the expected location, X2',Y2',Z2'. The location comparison engine 132 compares the location X2,Y2,Z2 to the expected location X2',Y2',Z2' and determines a location difference value. In the example of FIG. 1, the location difference value is 0,5.1,0 corresponding to no difference in the x and z directions and a 5.1 difference in the y direction.

In some implementations, determining the location difference between the previous expected location of the drone and the second previous location determined from the previously captured image data may include comparing first coordinates associated with the previous expected location of the drone and second coordinates associated with the second previous location determined from the previously captured image data. For example, as discussed in reference to FIG. 1, the location difference value may be determined to be 0,5.1,0 corresponding to no difference in the x and z directions and a 5.1 difference in the y direction after comparing coordinates of the previous expected location and coordinates of the actual previous location as determined by data captured at a corresponding time.

In some implementations, other methods of location representation are used. For example, instead of using three numerical values to represent x, y, and z coordinates, a system can use 3 values, one representing an angle, one representing a radius value, and one representing an altitude. In some cases, additional values can be used to describe the pose of the robot 112. For example, values associated with yaw, pitch, and roll or similar variables, can be used to determine the pose of the robot 112. Localization can be used to determine both a corrected location and a corrected pose of the robot 112 depending on implementation. In some cases, localization can be used to determine either a corrected location or a corrected pose. For pose corrections, the control unit 120 can process previous image data similar to the process shown in FIG. 1. A previous actual pose can be determined and compared to an expected pose. The difference in pose can be used to obtain a corrected pose. The movement controller 136 can be used to change a current post of the robot 112 to the corrected pose.

In some implementations, the robot 112 prioritizes a route that contains features for localization. For example, as part of initial route planning related to a current mission, the robot 112 can prioritize a first route over a second route when the robot 112 determines that the first route includes more features or features that are likely to give an accurate localization compared to the second route. Features that are likely to give an accurate localization can include features on a property that were captured in detail during initial generation of a local map. Features that are likely to give an accurate localization can also include features that are in well-lit locations or are in positions easy for onboard sensors to capture.

The process 200 includes determining the current location of the drone based on the location difference (210). For example, the error propagation engine 134 determines based on the location difference calculated by the location comparison engine 132 and subsequent movements by the robot 112 that the current location is X3,Y3,Z3. The current location can then be used to determine the corrected location of X3,Y3-5.1,Z3. The movement controller 136 can be used to activate propellers or other motorized elements on the robot 112. The motorized elements can be activated to move from the current location X3,Y3,Z3 to the corrected location X3,Y3-5.1,Z3.

In some implementations, determining the current location of the drone based on the location difference includes combining one or more components of the location difference with one or more components of an expected current location. For example, as discussed in reference to FIG. 1, if the difference between past expected an actual location based on stored images is equal to the components 0,5.1,0 indicating a change in location relative to a chosen coordinate system, the difference may be combined with the current location to determine a more accurate current location. If the current location is represented in Cartesian coordinates as X3,Y3,Z3 and the difference value is also represented in Cartesian coordinates as 0,5.1,0, the components may be combined to generate a more accurate current location of X3,Y3-5.1,Z3 where if combining using addition or subtraction, the sign of the terms for combination may be determined based on whether a past expected location is larger or smaller than a past actual location as determined by past collected data and localization processes. For example, if a past expected location has a larger component value than a computed actual past location, than the sign representing change in the current location may be negative and vice versa.

In some implementations, the process 200 may include determining the expected current location based on data collected after the first previous location using odometry. For example, the robot 112 can detect an element on the right of the field of view move to the left of the field of view subsequent to movements performed by the robot 112. The robot 112 can determine, based on the relative movement of the element from the right of the field of view to the left of the field of view, that the robot 112 moved from left to right among other details. In some cases, other sensors, include an accelerometer, may be used to determine relative change in location based on a known starting place. In this way, the robot 112 may determine a relative change in location which may represent the expected current location. Because the expected current location is based on relative positioning, it may be liable to include error owing to drift or error within the measurements since the last localization.

In some implementations, the process 200 may include determining the second previous location based on one or more visual features represented in the previously captured image data, one or more known locations corresponding to the one or more visual features, and one or more determined distances from the drone to the one or more visual features. For example, as described in reference to FIG. 1, the control unit 120 of the robot 112 performs localization in order to re-localize the robot 112.

In some implementations, the process 200 may include determining the first previous location based on one or more visual features represented in the other image data captured before the previously captured image data. For example, the first previous location may be determined using localization techniques described herein. Relative localizing techniques, including VIO, may be used in relation to the determined first previous location in order to determine the previous expected location. That is, the previous expected location may be liable to error and drift as discussed as it may be based on the first previous location plus or minus any location shifts subsequently captured until a time corresponding to the capturing of the previously captured image data.

In some implementations, the process 200 may include determining the previous expected location based on data collected after the first previous location using odometry. As described herein, the previous expected location may be based on the first previous location plus or minus any location shifts subsequently captured until a time corresponding to the capturing of the previously captured image data.

Figure 3:
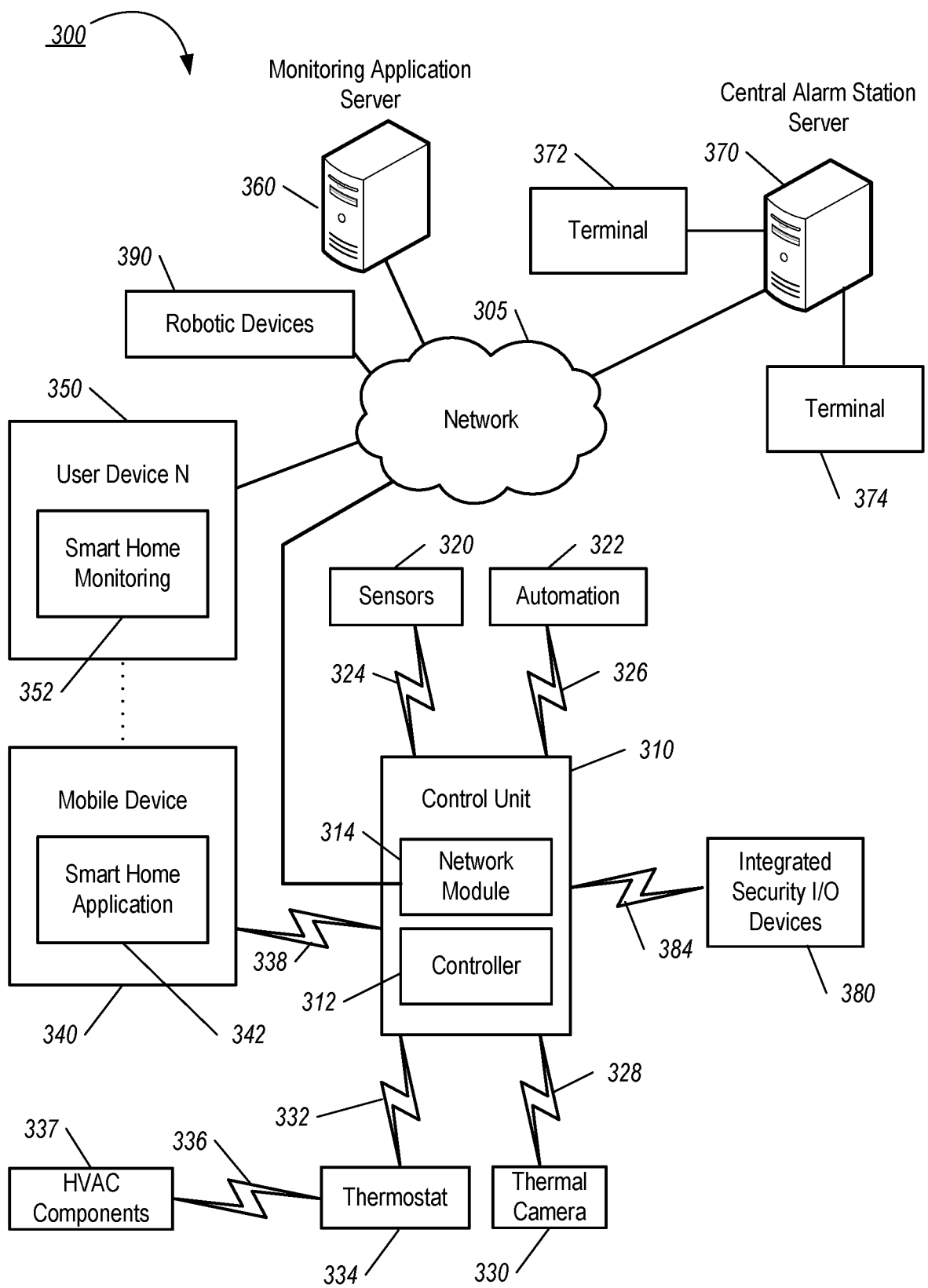
FIG. 3 is a diagram illustrating an example of a property monitoring system.

FIG. 3 is a diagram illustrating an example of a property monitoring system. The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors 320. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 320 can also include a radio-frequency identification (RFID) sensor that identifies a particular article that includes a pre-assigned RFID tag.

The system 300 also includes one or more thermal cameras 330 that communicate with the control unit 310. The thermal camera 330 may be an IR camera or other type of thermal sensing device configured to capture thermal images of a scene. For instance, the thermal camera 330 may be configured to capture thermal images of an area within a building or home monitored by the control unit 310. The thermal camera 330 may be configured to capture single, static thermal images of the area and also video thermal images of the area in which multiple thermal images of the area are captured at a relatively high frequency (e.g., thirty images per second). The thermal camera 330 may be controlled based on commands received from the control unit 310. In some implementations, the thermal camera 330 can be an IR camera that captures thermal images by sensing radiated power in one or more IR spectral bands, including NIR, SWIR, MWIR, and/or LWIR spectral bands.

The thermal camera 330 may be triggered by several different types of techniques. For instance, a Passive Infra-Red (PIR) motion sensor may be built into the thermal camera 330 and used to trigger the thermal camera 330 to capture one or more thermal images when motion is detected. The thermal camera 330 also may include a microwave motion sensor built into the camera and used to trigger the thermal camera 330 to capture one or more thermal images when motion is detected. The thermal camera 330 may have a "normally open" or "normally closed" digital input that can trigger capture of one or more thermal images when external sensors (e.g., the sensors 320, PIR, door/window, etc.) detect motion or other events. In some implementations, the thermal camera 330 receives a command to capture an image when external devices detect motion or another potential alarm event. The thermal camera 330 may receive the command from the controller 312 or directly from one of the sensors 320.

In some examples, the thermal camera 330 triggers integrated or external illuminators (e.g., Infra-Red or other lights controlled by the property automation controls 322, etc.) to improve image quality. An integrated or separate light sensor may be used to determine if illumination is desired and may result in increased image quality.

The thermal camera 330 may be programmed with any combination of time/day schedules, monitoring system status (e.g., "armed stay," "armed away," "unarmed"), or other variables to determine whether images should be captured or not when triggers occur. The thermal camera 330 may enter a low-power mode when not capturing images. In this case, the thermal camera 330 may wake periodically to check for inbound messages from the controller 312. The thermal camera 330 may be powered by internal, replaceable batteries if located remotely from the control unit 310. The thermal camera 330 may employ a small solar cell to recharge the battery when light is available. Alternatively, the thermal camera 330 may be powered by the controller's 312 power supply if the thermal camera 330 is co-located with the controller 312.

In some implementations, the thermal camera 330 communicates directly with the monitoring server 360 over the Internet. In these implementations, thermal image data captured by the thermal camera 330 does not pass through the control unit 310 and the thermal camera 330 receives commands related to operation from the monitoring server 360.

In some implementations, the system 300 includes one or more visible light cameras, which can operate similarly to the thermal camera 330, but detect light energy in the visible wavelength spectral bands. The one or more visible light cameras can perform various operations and functions within the property monitoring system 300. For example, the visible light cameras can capture images of one or more areas of the property, which the cameras, the control unit, and/or another computer system of the monitoring system 300 can process and analyze.

The system 300 also includes one or more property automation controls 322 that communicate with the control unit to perform monitoring. The property automation controls 322 are connected to one or more devices connected to the system 300 and enable automation of actions at the property. For instance, the property automation controls 322 may be connected to one or more lighting systems and may be configured to control operation of the one or more lighting systems. Also, the property automation controls 322 may be connected to one or more electronic locks at the property and may be configured to control operation of the one or more electronic locks (e.g., control Z-Wave locks using wireless communications in the Z-Wave protocol). Further, the property automation controls 322 may be connected to one or more appliances at the property and may be configured to control operation of the one or more appliances. The property automation controls 322 may include multiple modules that are each specific to the type of device being controlled in an automated manner. The property automation controls 322 may control the one or more devices based on commands received from the control unit 310. For instance, the property automation controls 322 may interrupt power delivery to a particular outlet of the property or induce movement of a smart window shade of the property.

The system 300 also includes thermostat 334 to perform dynamic environmental control at the property. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at the property and/or environmental data at the home, e.g., at various locations indoors and outdoors at the property. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more property automation controls 322.

In some implementations, a module 337 is connected to one or more components of an HVAC system associated with the property, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robot that are capable of moving and taking actions that assist in home monitoring. For example, the robotic devices 390 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 390 may be robotic devices 390 that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a property. In these examples, the robotic devices 390 include sensors and control processors that guide movement of the robotic devices 390 within the property. For instance, the robotic devices 390 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the property and guide movement of the robotic devices 390 in a manner that avoids the walls and other obstacles.

In addition, the robotic devices 390 may store data that describes attributes of the property. For instance, the robotic devices 390 may store a floorplan of a building on the property and/or a three-dimensional model of the property that enables the robotic devices 390 to navigate the property. During initial configuration, the robotic devices 390 may receive the data describing attributes of the property, determine a frame of reference to the data (e.g., a property or reference location in the property), and navigate the property based on the frame of reference and the data describing attributes of the property. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, one or more of the thermal cameras 330 may be mounted on one or more of the robotic devices 390.

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the property. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the property. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid state electronic storage that enables the robotic devices 390 to store applications, configuration data, collected sensor data, and/or any other type of information available to the robotic devices 390.

The robotic devices 390 can be associated with one or more charging stations. The charging stations may be located at predefined home base or reference locations at the property. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact-based charging stations and/or wireless charging stations. For contact-based charging stations, the robotic devices 390 may have readily accessible points of contact that the robotic devices 390 are capable of positioning and mating with a corresponding contact on the charging station. For instance, a helicopter type robotic device 390 may have an electronic contact on a portion of its landing gear that rests on and mates with an electronic pad of a charging station when the helicopter type robotic device 390 lands on the charging station. The electronic contact on the robotic device 390 may include a cover that opens to expose the electronic contact when the robotic device 390 is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the property may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device 390 may always use a first charging station and a second robotic device 390 may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the property that is not associated with a charger. The number of community charging stations may be less than the number of robotic devices 390.

Also, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device 390 to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the property automation controls 322, the thermal camera 330, the thermostat 334, and the integrated security devices 380 may communicate with the controller 312 over communication links 324, 326, 328, 332, and 384. The communication links 324, 326, 328, 332, and 384 may be a wired or wireless data pathway configured to transmit signals from the sensors 320, the property automation controls 322, the thermal camera 330, the thermostat 334, and the integrated security devices 380 to the controller 312. The sensors 320, the property automation controls 322, the thermal camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, and 384 may include a local network. The sensors 320, the property automation controls 322, the thermal camera 330, the thermostat 334, and the integrated security devices 380, and the controller 312 may exchange data and commands over the local network. The local network may include 802.11 "Wi- Fi" wireless Ethernet (e.g., using low-power Wi-Fi chipsets), Z-Wave, Zigbee, Bluetooth, "Homeplug" or other "Powerline" networks that operate over AC wiring, and a Category 3 (CAT5) or Category 6 (CAT6) wired Ethernet network. The local network may be a mesh network constructed based on the devices connected to the mesh network.

The monitoring server 360 is one or more electronic devices configured to provide monitoring services by exchanging electronic communications with the control unit 310, the one or more user devices 340 and 350, and the central alarm station server 370 over the network 305. For example, the monitoring server 360 may be configured to monitor events (e.g., alarm events) generated by the control unit 310. In this example, the monitoring server 360 may exchange electronic communications with the network module 314 included in the control unit 310 to receive information regarding events (e.g., alerts) detected by the control unit 310. The monitoring server 360 also may receive information regarding events (e.g., alerts) from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor data, thermal image data, and other monitoring system data received from the monitoring system and perform analysis of the sensor data, thermal image data, and other monitoring system data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, thermal image, and other data to determine an activity pattern of a resident of the property monitored by the system 300. In some implementations, the monitoring server 360 may analyze the data for alarm conditions or may determine and perform actions at the property by issuing commands to one or more of the automation controls 322, possibly through the control unit 310.

The central alarm station server 370 is an electronic device configured to provide alarm monitoring service by exchanging communications with the control unit 310, the one or more mobile devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring server 360 and/or the control unit 310 over the network 305. The user device 350 may be configured to display a smart home user interface 352 that is generated by the user device 350 or generated by the monitoring server 360. For example, the user device 350 may be configured to display a user interface (e.g., a web page) provided by the monitoring server 360 that enables a user to perceive images captured by the thermal camera 330 and/or reports related to the monitoring system. Although FIG. 3 illustrates two user devices for brevity, actual implementations may include more (and, perhaps, many more) or fewer user devices.

The smart home application 342 and the smart home user interface 352 can allow a user to interface with the property monitoring system 300, for example, allowing the user to view monitoring system settings, adjust monitoring system parameters, customize monitoring system rules, and receive and view monitoring system messages.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors 320 and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system 300.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the property automation controls 322, the thermal camera 330, and the robotic devices 390. The one or more user devices 340 and 350 receive data directly from the sensors 320, the property automation controls 322, the thermal camera 330, and the robotic devices 390 (i.e., the monitoring system components) and sends data directly to the monitoring system components. The one or more user devices 340, 350 provide the appropriate interfaces/processing to provide visual surveillance and reporting.

In other implementations, the system 300 further includes network 305 and the sensors 320, the property automation controls 322, the thermal camera 330, the thermostat 334, and the robotic devices 39 are configured to communicate sensor and image data to the one or more user devices 340 and 350 over network 305 (e.g., the Internet, cellular network, etc.). In yet another implementation, the sensors 320, the property automation controls 322, the thermal camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the property automation controls 322, the thermal camera 330, the thermostat 334, and the robotic devices 390 to a pathway over network 305 when the one or more user devices 340 and 350 are farther from the sensors 320, the property automation controls 322, the thermal camera 330, the thermostat 334, and the robotic devices 390. In some examples, the system leverages GPS information from the one or more user devices 340 and 350 to determine whether the one or more user devices 340 and 350 are close enough to the monitoring system components to use the direct local pathway or whether the one or more user devices 340 and 350 are far enough from the monitoring system components that the pathway over network 305 is required. In other examples, the system leverages status communications (e.g., pinging) between the one or more user devices 340 and 350 and the sensors 320, the property automation controls 322, the thermal camera 330, the thermostat 334, and the robotic devices 390 to determine whether communication using the direct local pathway is possible. If communication using the direct local pathway is possible, the one or more user devices 340 and 350 communicate with the sensors 320, the property automation controls 322, the thermal camera 330, the thermostat 334, and the robotic devices 390 using the direct local pathway. If communication using the direct local pathway is not possible, the one or more user devices 340 and 350 communicate with the monitoring system components using the pathway over network 305.

In some implementations, the system 300 provides end users with access to thermal images captured by the thermal camera 330 to aid in decision making. The system 300 may transmit the thermal images captured by the thermal camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 330 or other cameras of the system 300). In these implementations, the thermal camera 330 may be set to capture thermal images on a periodic basis when the alarm system is armed in an "armed away" state, but set not to capture images when the alarm system is armed in an "armed stay" or "unarmed" state. In addition, the thermal camera 330 may be triggered to begin capturing thermal images when the alarm system detects an event, such as an alarm event, a door-opening event for a door that leads to an area within a field of view of the thermal camera 330, or motion in the area within the field of view of the thermal camera 330. In other implementations, the thermal camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure. A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method comprising:
   maintaining first image data captured by a camera for a drone and second image data captured by the camera, the first image data captured prior to the second image data;
   after maintaining the first image data and the second image data, determining that current data captured at a current location of the drone satisfies localization adjustment criteria;
   in response to determining that the current data captured at the current location of the drone satisfies the localization adjustment criteria, accessing an actual previous location of the drone that was determined using the second image data;
   determining, using (i) the first image data and (ii) an expected change in location of the drone, an expected previous location of the drone;
   determining a location difference between (i) the expected previous location of the drone and (ii) the actual previous location of the drone; and
   determining the current location of the drone using the location difference.

2. The method of claim 1, wherein determining that the current data captured at the current location of the drone satisfies the localization adjustment criteria comprises:
   detecting no visual features in one or more images of the current data.

3. The method of claim 1, wherein determining that the current data captured at the current location of the drone satisfies the localization adjustment criteria comprises:
   determining that one or more expected visual features are not shown in one or more images of the current data.

4. The method of claim 1, wherein determining that the current data captured at the current location of the drone satisfies the localization adjustment criteria comprises:
   comparing an expected sensor value to an actual sensor value of the current data; and
   determining that the current data captured at the current location of the drone satisfies the localization adjustment criteria based on a difference between the expected sensor value and the actual sensor value.

5. The method of claim 1, wherein, prior to accessing the actual previous location of the drone, the method comprises:
   determining the actual previous location of the drone using the second image data, wherein the second image data includes at least one visual feature.

6. The method of claim 1, wherein determining the location difference between the expected previous location of the drone and the actual previous location comprises:
   comparing first coordinates associated with the expected previous location of the drone and second coordinates associated with the actual previous location determined using the second image data.

7. The method of claim 1, wherein determining the current location of the drone using the location difference comprises:
combining one or more components of the location difference with one or more components of an expected current location.

8. The method of claim 7, comprising:
determining the expected current location using data collected after the actual previous location using odometry.

9. The method of claim 1, comprising:
determining the actual previous location using one or more visual features represented in the second image data, one or more known locations corresponding to the one or more visual features, and one or more determined distances from the drone to the one or more visual features.

10. The method of claim 1, comprising:
determining a first previous location using one or more visual features represented in the first image data.

11. The method of claim 1, wherein the first image data is stored in a buffer image database.

12. The method of claim 1, comprising:
determining the expected previous location using data collected after an initial localization process using odometry.

13. A system comprising one or more computers and one or more storage devices on which are stored instructions that are operable, when executed by the one or more computers, to cause the one or more computers to perform operations comprising:
maintaining first image data captured by a camera for a drone and second image data captured by the camera, the first image data captured prior to the second image data;
after maintaining the first image data and the second image data, determining that current data captured at a current location of the drone satisfies localization adjustment criteria;
in response to determining that the current data captured at the current location of the drone satisfies the localization adjustment criteria, accessing an actual previous location of the drone that was determined using the second image data;
determining, using (i) the first image data and (ii) an expected change in location of the drone, an expected previous location of the drone;
determining a location difference between (i) the expected previous location of the drone and (ii) the actual previous location of the drone; and
determining the current location of the drone using the location difference.

14. The system of claim 13, wherein determining that the current data captured at the current location of the drone satisfies the localization adjustment criteria comprises:
detecting no visual features in one or more images of the current data.

15. The system of claim 13, wherein determining that the current data captured at the current location of the drone satisfies the localization adjustment criteria comprises:
determining that one or more expected visual features are not shown in one or more images of the current data.

16. The system of claim 13, wherein determining that the current data captured at the current location of the drone satisfies the localization adjustment criteria comprises:
comparing an expected sensor value to an actual sensor value of the current data; and
determining that the current data captured at the current location of the drone satisfies the localization adjustment criteria based on a difference between the expected sensor value and the actual sensor value.

17. The system of claim 13, wherein, prior to accessing the actual previous location of the drone, the operations comprise:
determining the actual previous location of the drone using the second image data, wherein the second image data includes at least one visual feature.

18. The system of claim 13, wherein determining the location difference between the expected previous location of the drone and the actual previous location comprises:
comparing first coordinates associated with the expected previous location of the drone and second coordinates associated with the actual previous location determined using the second image data.

19. The system of claim 13, wherein determining the current location of the drone using the location difference comprises:
combining one or more components of the location difference with one or more components of an expected current location.

20. A non-transitory computer storage medium encoded with instructions that, when executed by one or more computers, cause the one or more computers to perform operations comprising:
maintaining first image data captured by a camera for a drone and second image data captured by the camera, the first image data captured prior to the second image data;
after maintaining the first image data and the second image data, determining that current data captured at a current location of the drone satisfies localization adjustment criteria;
in response to determining that the current data captured at the current location of the drone satisfies the localization adjustment criteria, accessing an actual previous location of the drone that was determined using the second image data;
determining, using (i) the first image data and (ii) an expected change in location of the drone, an expected previous location of the drone;
determining a location difference between (i) the expected previous location of the drone and (ii) the actual previous location of the drone; and
determining the current location of the drone using the location difference.

* * * * *